(12) United States Patent
Velusamy et al.

(10) Patent No.: US 10,725,697 B2
(45) Date of Patent: Jul. 28, 2020

(54) ROUND ROBIN SYSTEM WITH INTERLEAVED WEIGHTED AND PRIORITY ARBITERS TO SERVE ON-DEMAND BANDWIDTH OF A STORAGE SYSTEM

(71) Applicant: Western Digital Technologies, Inc., San Jose, CA (US)

(72) Inventors: Sivaraj Velusamy, TamilNadu (IN); Chandra Sekhara Rao Lakkimsetty, Bangalore (IN); Eyal Hakoun, Sunnyvale, CA (US); Manikandan Sakthivel, Trichy (IN); Amar Nath Alamuri, Karnataka (IN); Arpit Mishra, Uttar Pradesh (IN); Himanshu Kumar Patel, Odisha (IN)

(73) Assignee: Western Digital Technologies, Inc., San Jose, CA (US)

( * ) Notice: Subject to any disclaimer, the term of this patent is extended or adjusted under 35 U.S.C. 154(b) by 17 days.

(21) Appl. No.: 15/975,543

(22) Filed: May 9, 2018

(65) Prior Publication Data
US 2019/0347039 A1 Nov. 14, 2019

(51) Int. Cl.
*G06F 3/00* (2006.01)
*G06F 3/06* (2006.01)
*G06F 13/16* (2006.01)
*G06F 9/48* (2006.01)
*G06F 9/30* (2018.01)

(52) U.S. Cl.
CPC .......... *G06F 3/0659* (2013.01); *G06F 3/0611* (2013.01); *G06F 3/0688* (2013.01); *G06F 9/4881* (2013.01); *G06F 13/1605* (2013.01); *G06F 9/3004* (2013.01)

(58) Field of Classification Search
None
See application file for complete search history.

(56) References Cited

U.S. PATENT DOCUMENTS

| 6,032,218 A | 2/2000 | Lewin et al. |
|---|---|---|
| 7,143,219 B1 | 11/2006 | Chaudhari et al. |
| 7,710,996 B1 | 5/2010 | Damaraju et al. |
| 2014/0281050 A1 | 9/2014 | Vogan |
| 2016/0266928 A1 | 9/2016 | Rimoni |

(Continued)

OTHER PUBLICATIONS

NVM Express, Revision 1.3 Specification; NVM Express, Inc.; May 1, 2017; 282 pages.

(Continued)

*Primary Examiner* — Midys Rojas
(74) *Attorney, Agent, or Firm* — Brinks Gilson & Lione (57) ABSTRACT

A round robin system with interleaved weighted and priority arbiters to serve on-demand bandwidth of a storage system are provided. In one embodiment, a host assigns a priority and weight to each of a plurality of memory commands. The memory commands are sent to the storage system in a priority round-robin manner, in which memory commands assigned to a relatively-higher priority level are sent to the storage system before memory commands assigned to a relatively-lower priority level. Further, memory commands assigned to a given priority level are sent to the storage system in a weighted round-robin manner in accordance with their assigned weight. Other embodiments are provided.

20 Claims, 8 Drawing Sheets

(56) References Cited

U.S. PATENT DOCUMENTS

2016/0266934 A1    9/2016  Rimoni
2018/0095662 A1*   4/2018  Brennan ................. G06F 3/061

OTHER PUBLICATIONS iXpand Flash Drive for iPhone and iPad/SanDisk Product Description; downloaded from the Internet at https://www..sandisk.com/home/mobile-device-storage/ixpand on Apr. 18, 2018; 12 pages.

* cited by examiner

ROUND ROBIN SYSTEM WITH INTERLEAVED WEIGHTED AND PRIORITY ARBITERS TO SERVE ON-DEMAND BANDWIDTH OF A STORAGE SYSTEM

BACKGROUND

An application (e.g., a mobile or computer application) running in a host can write/read files to/from a storage system by sending input/output requests to the storage system with the assistance of a file system running in the host. Some file systems execute input/output requests mostly sequentially. However, there can be some situations in which some input/output requests need to be executed without waiting for the previous input/output requests to be completed. In such situations, the host can use an intelligent arbitration algorithm to control the timing of when various input/output requests are sent to the storage system.

DETAILED DESCRIPTION

By way of introduction, the below embodiments relate to a round robin system with interleaved weighted and priority arbiters to serve on-demand bandwidth of a storage system. In one embodiment, a method for sending memory commands to a storage system is provided. The method is performed in a host in communication with a storage system and comprises assigning a priority and weight to each of a plurality of memory commands; and sending the plurality of memory commands to the storage system in accordance with their assigned priority and weight. Memory commands are sent to the storage system in a priority round-robin manner, in which memory commands assigned to a relatively-higher priority level are sent to the storage system before memory commands assigned to a relatively-lower priority level. Further, memory commands assigned to a given priority level are sent to the storage system in a weighted round-robin manner in accordance with their assigned weight.

In some embodiments, a weight assigned to a memory command corresponds to a percentage of available bandwidth required for the memory command.

In some embodiments, at least one of the priority and weight is user-configurable.

In some embodiments, at least one of the priority and weight is automatically determined.

In some embodiments, the method is performed by an application downloaded from a server.

In some embodiments, the storage system is embedded in the host.

In some embodiments, the storage system is removably connectable to the host.

In some embodiments, the storage system comprises a three-dimensional memory.

In another embodiment, a device is provided comprising a processor and a computer-readable medium that stores computer-readable program code executable by the processor, wherein, when executed, the computer-readable program code causes the processor to: generate a priority arbiter comprising a plurality of priority levels, wherein operations assigned to a relatively-higher priority level are given priority over operations assigned to a relatively-lower priority level; and generate a plurality of weighted round-robin arbiters; and send operations that are assigned respective priorities and weights to a storage system using the priority arbiter and the plurality of weighted round-robin arbiters. Each weighted round-robin arbiter is associated with a respective one of the plurality of priority levels, and each weighted round-robin arbiter is configured to send operations to its respective priority level in a weighted round-robin manner.

In some embodiments, a weight assigned to an operation corresponds to a percentage of available bandwidth required for the operation.

In some embodiments, at least one of the priority and weight is user-configurable.

In some embodiments, at least one of the priority and weight is automatically determined.

In some embodiments, the computer-readable program code comprises an application downloaded from a server.

In some embodiments, the device is in communication with a plurality of storage systems, and wherein, when executed, the computer-readable program code causes the processor to generate a separate set of priority and weighted round-robin arbiters for each storage system.

In some embodiments, the storage system is embedded in the device.

In some embodiments, the storage system is removably connectable to the device.

In some embodiments, the storage system comprises a three-dimensional memory.

In another embodiment, a device is provided comprising: means for assigning a priority and weight to each of a plurality of input-output requests; and means for sending the plurality of input-output requests to a storage system in accordance with their assigned priority and weight. Input-output requests are sent to the storage system in a priority round-robin manner, in which input-output requests assigned to a relatively-higher priority level are sent to the storage system before input-output requests assigned to a relatively-lower priority level. Further, input-output requests assigned to a given priority level are sent to the storage system in a weighted round-robin manner in accordance with their assigned weight.

In some embodiments, a weight assigned to an input-output request corresponds to a percentage of available bandwidth required for the input-output request.

In some embodiments, at least one of the priority and weight is user-configurable.

Other embodiments are possible, and each of the embodiments can be used alone or together in combination. Accordingly, various embodiments will now be described with reference to the attached drawings.

Figure 1:
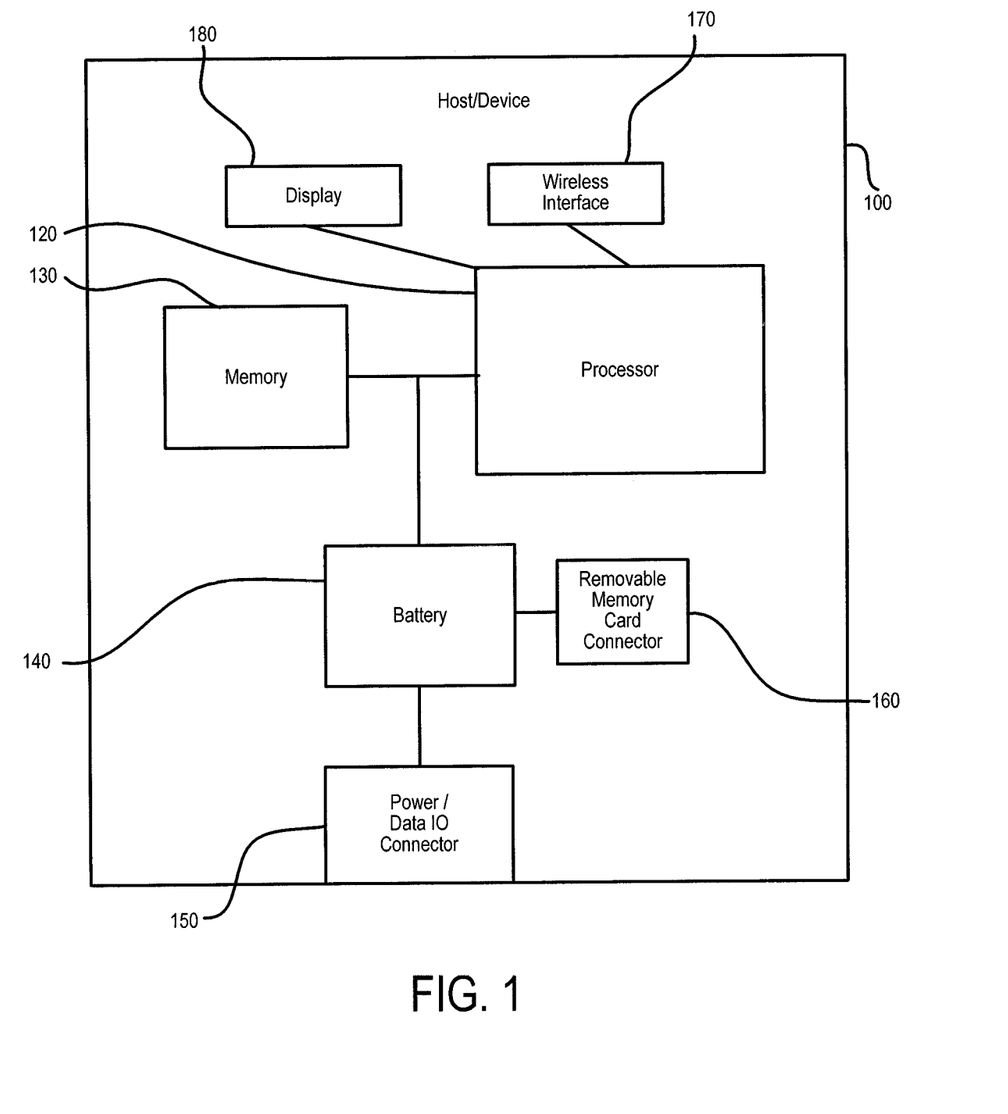
FIG. 1 is an illustration of a host of an embodiment.

Turning now to the drawings, FIG. 1 is an illustration of a host (or, more generally, a device) 100 of an embodiment. The host 100 can take any suitable form, such as, but not limited to, a smart phone (e.g., an Apple iPhone, an Android phone), a tablet (e.g., an Apple iPad), a "phablet," a book reader (e.g., an Amazon Kindle), a digital media player (e.g., an iPod), a game device, a personal digital assistant (PDA), a laptop, a wearable computer (e.g., a smart watch or Google Glasses), and any other mobile device where access to additional memory may be desired. As shown in FIG. 1, the host 100 in this embodiment comprises a processor 120 that can run an operating system and one or more applications (e.g., computer-readable program code (e.g., read from the memory 130) executable by the processor 120), a battery 140, and a port 150 for a power/data input/output (IO) connector, a port 160 for a removable memory card, a wireless interface 170, and a touch-sensitive display 180. The host 100 can contain different or additional components, which are not shown in FIG. 1 to simplify the drawing. For example, if the host 100 is a mobile smart phone, the host 100 can include hardware and/or software components to make and place telephone calls. The host 100 can also have a camera, a media player, etc. Of course, these are just some examples, and other implementations can be used.

As shown in FIG. 1, the host 100 has a memory 130, which can, for example, store content, computer-readable program code executable by the processor 120. Content can take any form, including, but not limited to, photos, videos, music, and data attachments. In addition to the internal memory 130, content can be stored or read from one or more storage systems, such as, but not limited to, a removable memory device (e.g., a microSD cards) inserted into the removable memory card connector port 160, an external storage device (e.g., on-the-go (OTG) dual universal serial bus (USB) drives) connected through the data IO connector port 150, and in various cloud services (e.g., Dropbox, Box, Google Drive, One Drive, etc.) in communication with the host 100 via the wireless interface 170. Any suitable wireless technology, now existing or later developed, can be used, including, but not limited to, 802.11 WiFi, near-field communication (NFC), Bluetooth (including Bluetooth Low Energy (LE), Nike+, ANT, ANT+, ZigBee, Radio Frequency for Consumer Electronics (RF4CE), and Infrared Data Association (IrDA).

Figure 2:
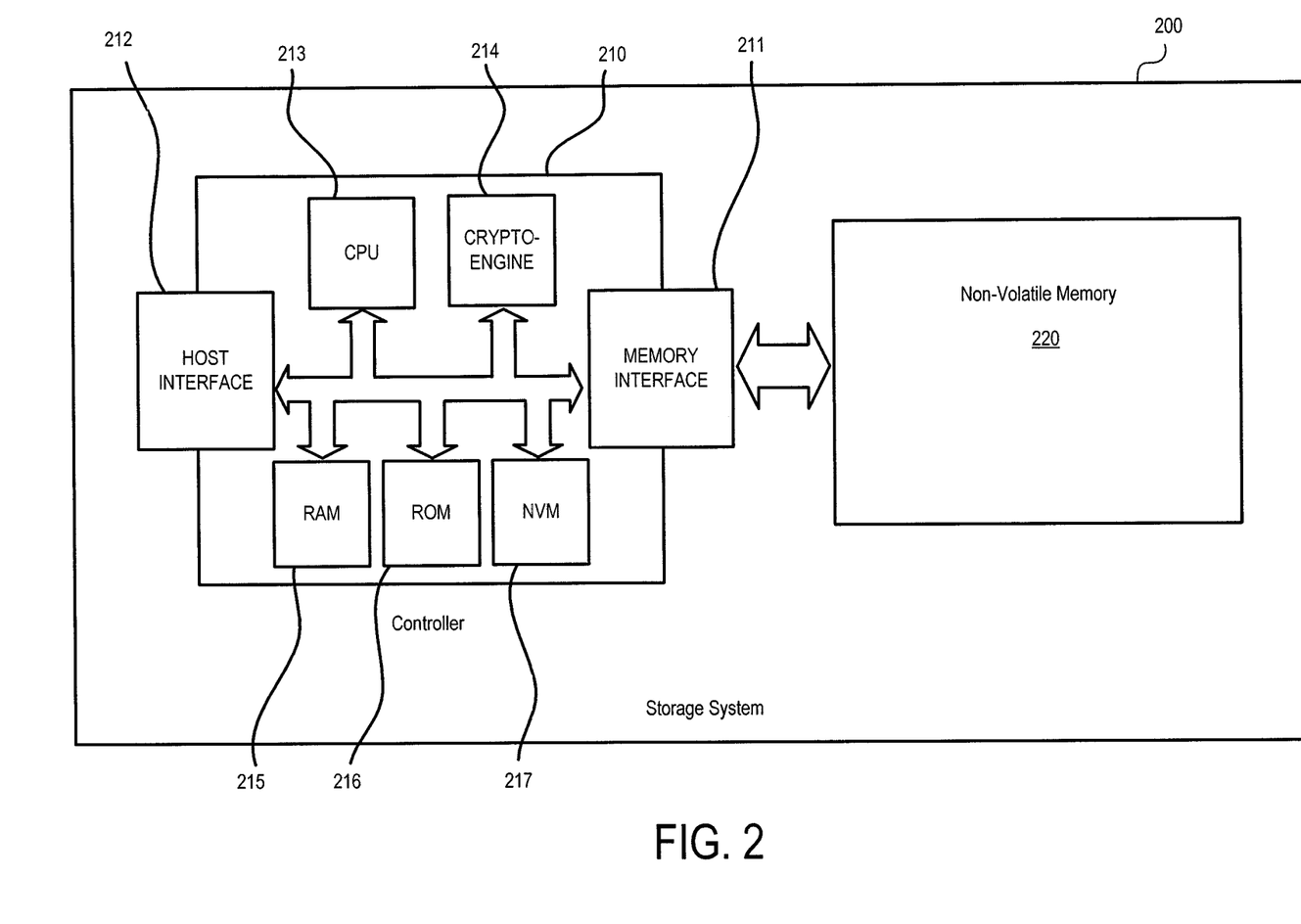
FIG. 2 is a block diagram of a storage system of an embodiment.

FIG. 2 is an illustration of an example storage system 200 of an embodiment. This general diagram can describe a removable memory card, an external storage device, or a cloud-based storage device. Of course, different or other components specific to the type of device can be used. Further, instead of being separate from the host 100, the storage system 200 can be embedded in the host 100. As shown in FIG. 2, the storage system 200 in one embodiment contains a controller 210 and non-volatile memory 220. In this embodiment, the controller 210 comprises a host interface 212 for placing the storage system 200 in communication with the host 100, and a memory interface 211 for placing the controller 210 in communication with the memory 220. (As used herein, the phrase "in communication with" (or "operatively in communication with") could mean directly in communication with or indirectly in communication with through one or more components, which may or may not be shown or described herein.) The host interface 212 can take any suitable form, such as, but are not limited to, a Serial AT Attachment (SATA), SATA Express, Serial Attached SCSI (SAS), Fibre Channel, USB, Peripheral Component Interconnect Express (PCIe), and Non-Volatile Memory Express (NVMe) interface. The host interface 212 can also comprises a wireless interface to wirelessly communicate with the host 100. The memory interface 211 can also take any suitable form, such as, but not limited to, a flash interface (e.g., Toggle Mode 200, 400, or 800).

The controller 210 also comprises a central processing unit (CPU) 213, an optional hardware crypto-engine 214 operative to provide encryption and/or decryption operations, read access memory (RAM) 215, read only memory (ROM) 216 which can store firmware for the basic operations of the storage device 240 and an application program interface, and a non-volatile memory (NVM) 217 which can store a device-specific key used for encryption/decryption operations, when used. The controller 210 can be implemented in any suitable manner. For example, the controller 210 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. (The host's processor 120 can take these forms as well.) Also, some of the components shown as being internal to the controller 210 can also be stored external to the controller 210, and other components can be used. For example, the RAM 215 (or an additional RAM unit) can be located outside of the controller die and used as a page buffer for data read from and/or to be written to the memory 220.

The non-volatile memory 220 can also take any suitable form, as can the internal memory 130. For example, in one embodiment, a memory takes the form of a solid-state (e.g., flash) memory and can be one-time programmable, few-time programmable, or many-time programmable. The memory can also use single-level cell (SLC) or multiple-level cell (MLC). The memory can also be a three-dimensional memory. The memory can take the form of NAND Flash memory or of other memory technologies, now known or later developed. Other examples of suitable types of memory are discussed below.

Figure 3:
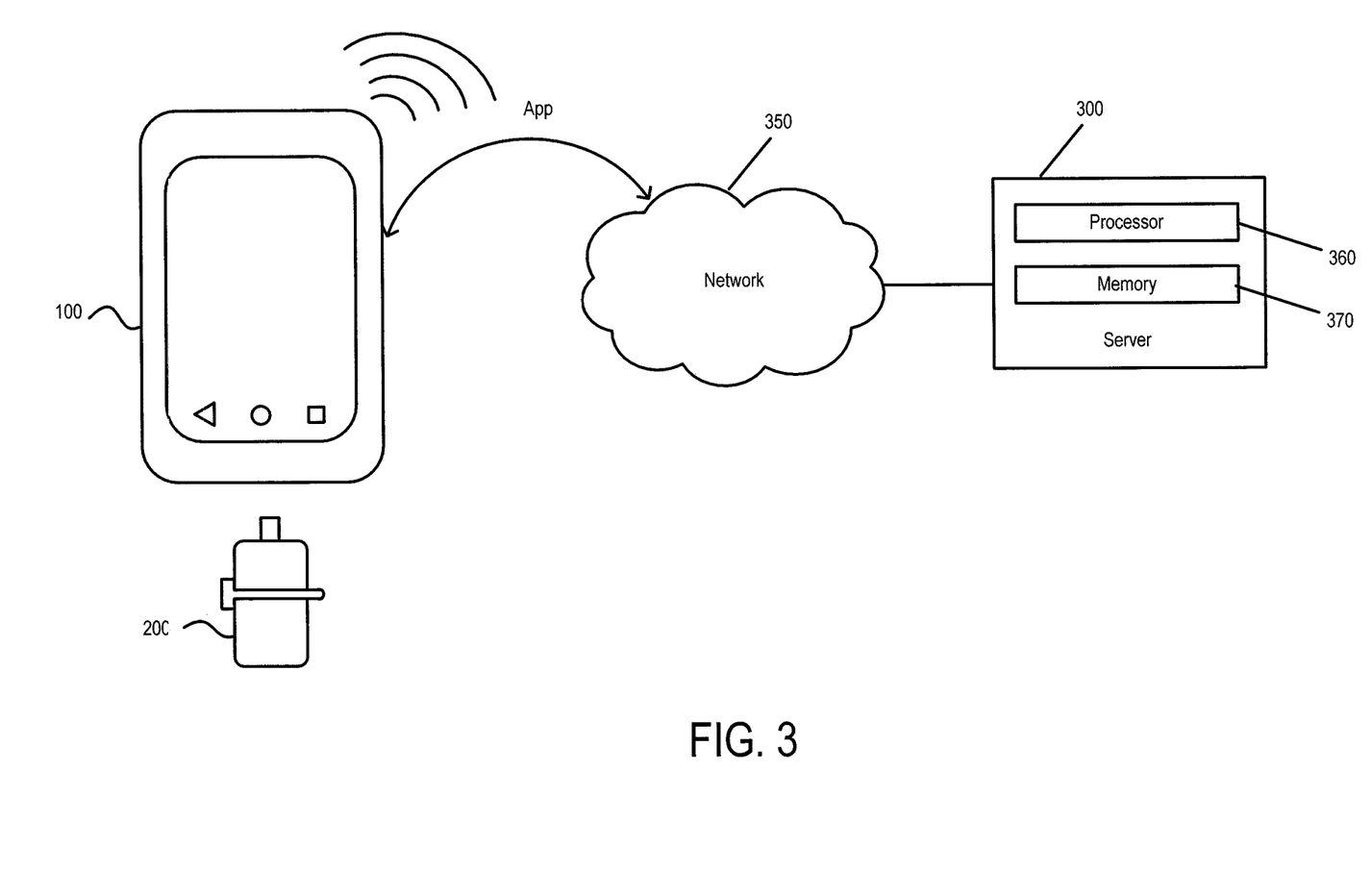
FIG. 3 is a block diagram of a network environment of an embodiment.

FIG. 3 is an illustration of a network environment of an embodiment. In this example, the host 100 takes the form of a mobile phone, and the storage system 200 takes the form of a removable storage device that connects to the host's IO connector 150 (see FIG. 1). Without intending on being a limitation, in one embodiment, the storage system 200 takes the form of an iXpand Flash Drive from SanDisk Corporation. Of course, other implementations can be used. The host 100 is in wireless communication with a server 300 via a network 350 (e.g., the Internet). The server 300 comprises a processor 360 and a memory 370. The memory 370 stores computer-readable program code (an app), and the processor 360 is configured to provide the app to the host 100 automatically or upon request. In this way, the host 100 can download the app. In one example, the app is for use with the storage system 200 and can be downloaded as part of the installation process of the storage system 200. Of course, this is merely an example, and other mechanisms can be used to provide the host 100 with the application.

Figure 4:
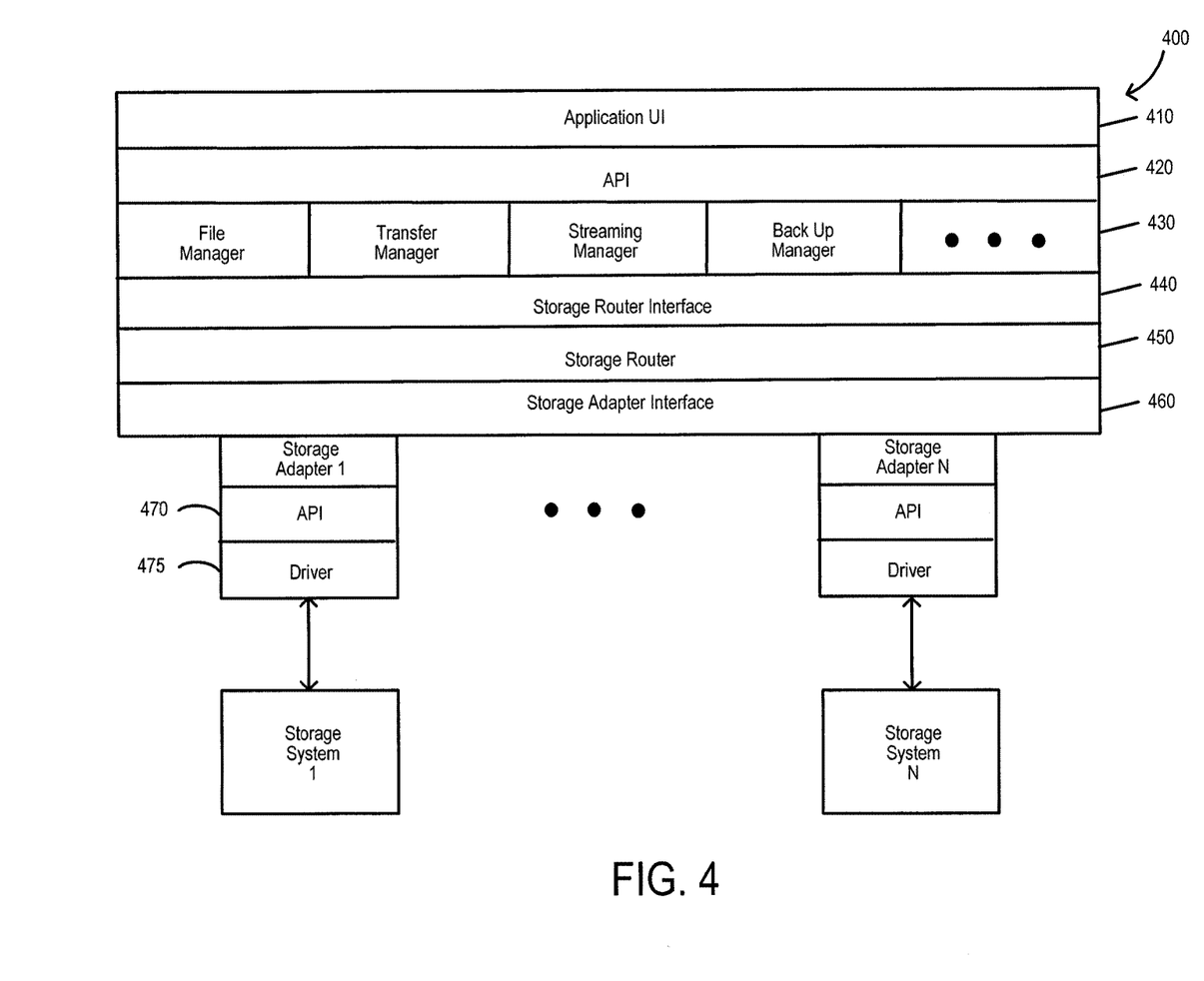
FIG. 4 is a software layer diagram of an embodiment.

Turning again to the drawings, FIG. 4 is a software layer architecture diagram 400 of an embodiment for an app downloaded (or otherwise provided) to the host 100 and is used to read/write data from/to one or more storage systems (1-N). As shown in FIG. 4, the app has an application user interface 410, which can, for example, provide a graphical user interface displayed on the display 180 of the host 100 to allow the user to choose data to read/write from/to the storage system, as well as provide other tasks, such as specifying various settings. An application program interface (API) is used to communicate between the application user interface 420 and one or more functionality modules (e.g., a file manager, a transfer manager, a streaming manager, a backup manager, etc.) 430. Those modules communicate via a storage router interface 440 to a storage router 450. The storage router 450 communicates via a storage adapter interface 460 to one or more storage adapters. In this embodiment, there is a storage adapter for each storage system. Each storage adapter comprises an application program interface (API) 470 and a low-level driver 475, which transmits the requests using the appropriate protocols. It should be noted that while N storage systems are shown in FIG. 4, in other embodiments, only one storage system is used with the app. It should also be noted that while the app/storage adapter/storage system architecture is being used in the example, these embodiments can be used with other architectures.

As mentioned above, an application (e.g., a mobile or computer application) running in a host can write/read files (e.g., content, such as, but not limited to, photos, videos, music, and data attachments) to/from a storage system by sending input/output requests (e.g., read and/or write commands or operations) to the storage system with the assistance of a file system running in the host. For example, file system operations can result in input/output requests to the storage system. Such file system operations can include, for example, transfer files (copy/move) from one storage device to another, delete files, backup files from one storage system to another (e.g., in the background), video playback, photo browsing, music playback, and thumbnail generation for the files stored in the storage system.

Some file systems execute input/output requests mostly sequentially. However, there can be some situations in which some input/output requests need to be executed without waiting for the previous input/output requests to be completed. In such situations, the host can use an intelligent arbitration algorithm to control the timing of when various input/output requests are sent to the storage system. The use of intelligent arbitration algorithms can lead to better performance and user experience of the app. Also, there can be scenarios where two input/output requests have same level of priority, in which case, the algorithm can assign certain weightage to each operation, so that the bandwidth of the storage system is distributed as per the weightage. That is, certain use cases demand a certain level of priority and weightage to be executed. Also, a storage system can have a certain bandwidth to accommodate input/output requests that need to be executed. That is, a given file operation (e.g., copy, move, delete, video playback, etc.) can demand a certain amount of bandwidth allocation to achieve a good user experience.

Figure 5A:
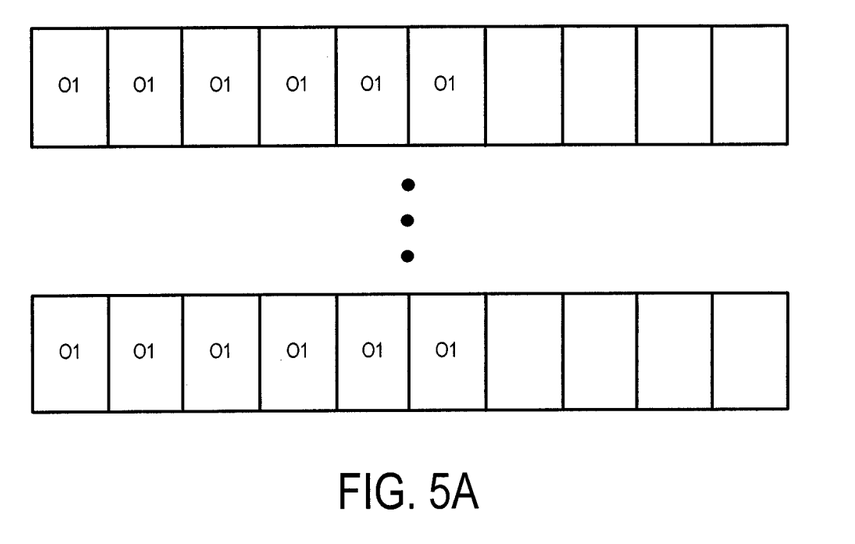
FIGS. 5A and 5B are illustrations of bandwidth usage scenarios of an embodiment.
Figure 5B:
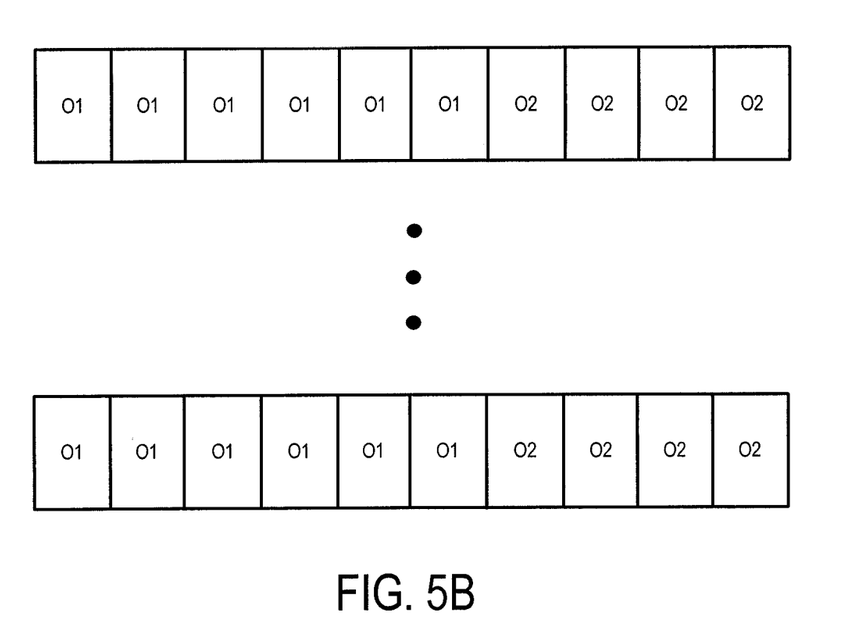

To illustrate these concepts, consider, for example, a scenario in which a video playback operation is considered to be a higher priority than a backup operation (to avoid the user having to wait to watch the video). When the user requests video playback by the host, the host can block the input/output requests of all other operations to give video playback fully priority (e.g., when video playback is happening, all other transfer operations can be paused). As such, the full bandwidth of the storage system will be allocated to video playback. However, video playback might not need the entire bandwidth of the storage system, which can result in wastage of bandwidth that could have been allocated for some other operation to most effectively use the bandwidth of the storage system. This is illustrated in the example in FIG. 5A. In this example, the bandwidth of the storage system is 10 MB/s (so, the one row of ten boxes in FIG. 5A represent one second, and each box represents the bandwidth of 1 MB/s). In this example, video playback needs 6 MB/s. So, the six boxes are used to send input/output requests for the video playback operation, and four boxes go unused (i.e., 4 MB/s is wasted). This wastage of 4 MB/s continues for every second until the video playback operation is completed. At that point, input/output requests of the next highest priority operation will be sent to the storage system. Ideally, instead of the 4 MB/s of wastage occurring, the unused bandwidth would be allocated for input/output requests of another operation (e.g., a backup operation). As shown in FIG. 5B, this would result in the full usage of the available bandwidth.

Figure 6:
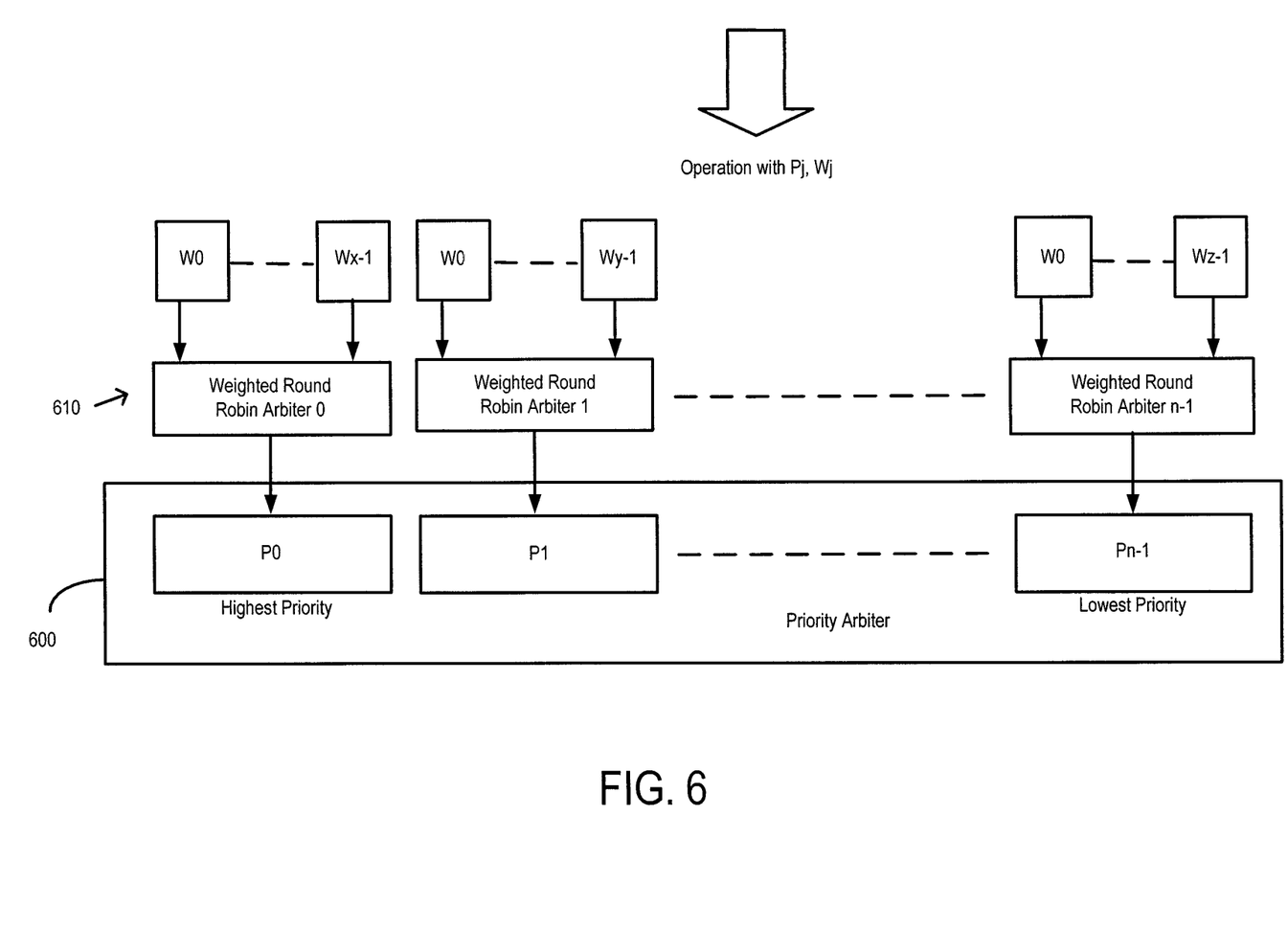
FIG. 6 is a block diagram of priority and weighed round-robin arbiters of an embodiment.

To address this situation, in one embodiment, the host 100 comprises a mechanism (e.g., an intermediate arbiter) that understands various use cases and their priorities. This mechanism can provide proper allocation of bandwidth as per the use case priorities and help achieve a seamless user experience of the application the user is interacting with on the host 100. As shown in FIG. 6, in one embodiment, this mechanism takes the form of a priority arbiter 600 and a plurality of weighted round-robin arbiters 610. This provides a weighted round-robin system inside a priority round-robin system to send memory operations to the storage system 200. Accordingly, arbitration happens at two levels. The first level is priority round robin, and, inside it, there is a second-level arbitration that is weighed round robin. This is in contrast to other arbitration systems that are independent (e.g., to select one among several submission queues). In one embodiment, these arbiters 600, 610 are part of the storage adapter associated with the relevant storage system (see FIG. 4). In that embodiment, each storage system has its own adapter and, hence, its own priority and weighted round-robin arbiters. In one embodiment, these arbiters 600, 610 are generated when the host's processor 120 executes the app (computer-readable program code) associated with the storage system, after the app is downloaded from the server 300 and stored in the host's internal memory 130.

As shown in FIG. 6, the priority arbiter 600 is configured with "n" number of priorities (P0, P1, . . . Pn−1). Each priority element is assigned a different priority level (0 to n−1), wherein a priority element with a relatively-higher priority level (e.g., P0) has priority over a priority element with a relatively-lower priority level (e.g., P1). Each priority element (P0, P1, . . . Pn−1) runs a separate and independent weighted round robin arbiter (i.e., priority element 0 runs weighed round-robin arbiter 0, priority element 1 runs weighed round-robin arbiter 1, etc.). In each weighted round robin arbiter 610, there are "x" number of operations (W0 . . . Wx−1) (e.g., input-output requests) to be served by the arbiter 610. Thus, each weighted round-robin arbiter 610 is associated with a respective one of the plurality of priority elements in the priority arbiter 600, and each weighted round-robin arbiter 610 is configured to send input-output commands to its respective priority arbiter in a weighted round-robin manner (e.g., in equal portions and in circular order, per the weight given to the operation). Input-output requests that are assigned respective priorities and weights are sent to the storage system 200 using the priority arbiter 600 and the plurality of weighted round-robin arbiters 610. The following paragraphs discuss how these arbiters 600, 610 work generally and how they can be used to maximize bandwidth efficiencies.

As shown in FIG. 6, operations (e.g., from an application running on the host 100) are sent to the plurality of weighted round-robin arbiters 610. In one embodiment, the application assigns a priority and weight to each operation. As will be discussed in more detail below, the priority and/or weight assigned to a given operation can be configured by a user (e.g., through settings in the user interface of the application) or can be automatically configured (e.g., through machine learning or artificial intelligence). Operations of the same priority are routed through the weighted round-robin arbiter associated with that priority element, and that weighted round-robin arbiter orders the operations per their assigned weight and sends the commands in that order to the associated priority element. The priority arbiter 600 then determines which operations to send to the storage system 100 based on which priority elements have pending operations. The highest priority elements send their operations to the storage system 200 first, in the order set by the weighted round-robin arbiter. That is, the operations are sent to the storage system 200 in a priority round-robin manner, in which operations assigned to a relatively-higher priority level are sent to the storage system 200 before operations assigned to a relatively-lower priority level. And operations assigned to a given priority level are sent to the storage system 200 in a weighted round-robin manner in accordance with their assigned weight. That is, operations within the same priority level will be served based on the weightage, and the highest priority will be served first until completion These principles will now be illustrated in several examples. In these examples, each operation will be represented by O(Pi,Wj), where Pi is the priority, and Wj is the weightage. If Operation O(Pj,Wj) is the only operation in the system, all bandwidth will be allocated to that operation. If there are the following operations in the system: O(P0, Wi) and O(P0, Wj), and if Wi=Wj, then both the operations will get equal bandwidth. However, if Wi=70, and Wj=30, then O(P0, Wi) will consume 70% of the bandwidth, and O(P0, Wj) will consume 30% of the bandwidth. If there are the following operations in the system: O(P0, Wi) and O(Pn, Wj), where n>0, all bandwidth will be consumed by O(P0, Wi). Once it is done completely, O(Pn, Wj) will start the execution. Also assume that each operation has the size of 10 MB, and each I/O request size is 1 MB. Accordingly, the number of I/O requests to complete a 10 MB file is 10 (10 MB/1 MB=10 I/O requests).

Figure 7:
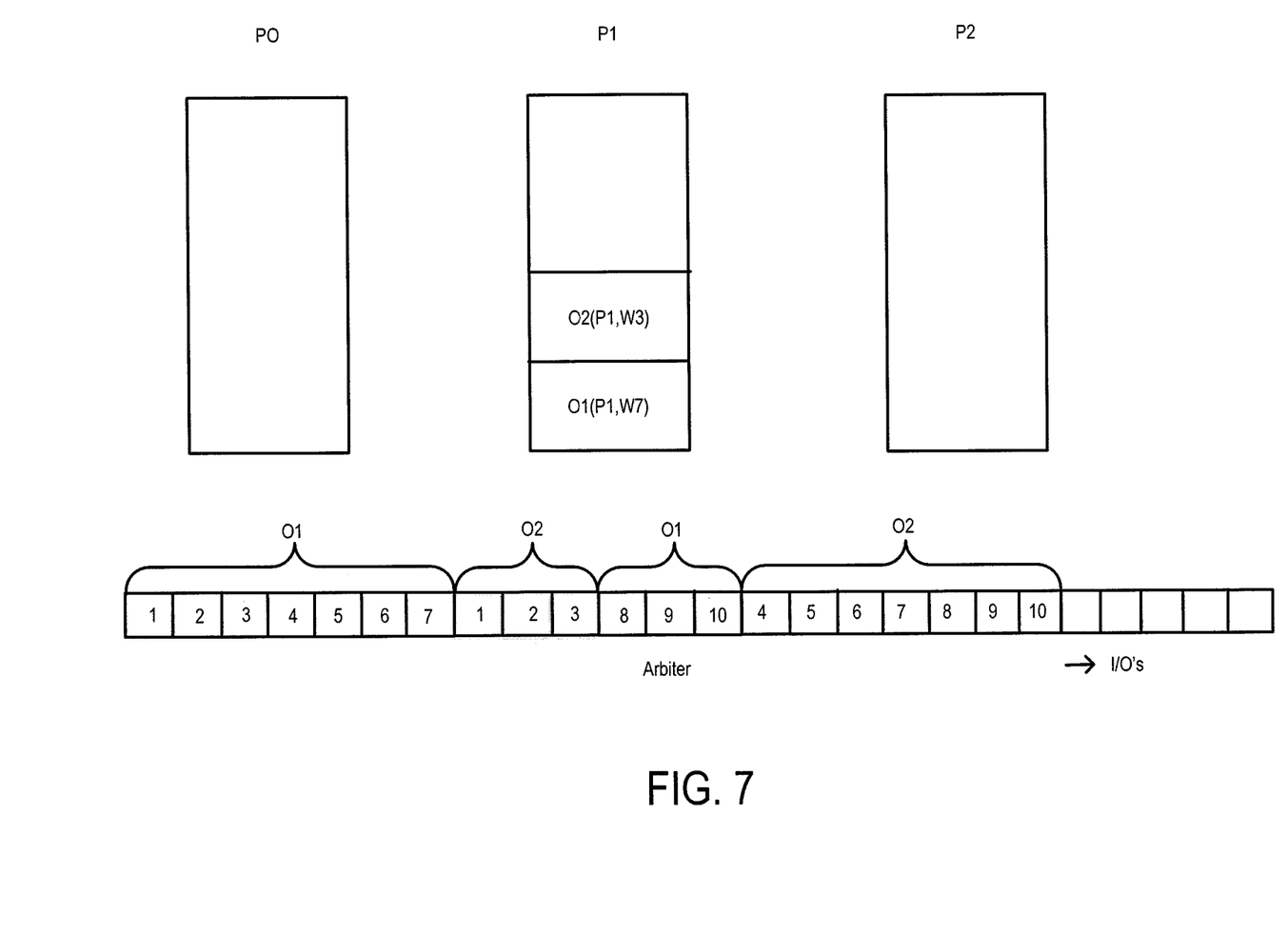
FIG. 7 is a block diagram of a use case of an embodiment.

FIG. 7 illustrates one example to explain how the weighted round robin arbiter works. As shown in FIG. 7, all operations are assigned to a single priority element. There are two operations (O1(P1, W3) and O2(P1, W7)), and the number of I/O requests allocated to each operation is based on the weightage. The weighted arbiter will execute 7 I/O request of O1 (because it has a weight of 7 out of 10) and then execute 3 I/O requests of O2 (because it has a weight of 3 out of 10). They operations then complete in order.

Figure 8:
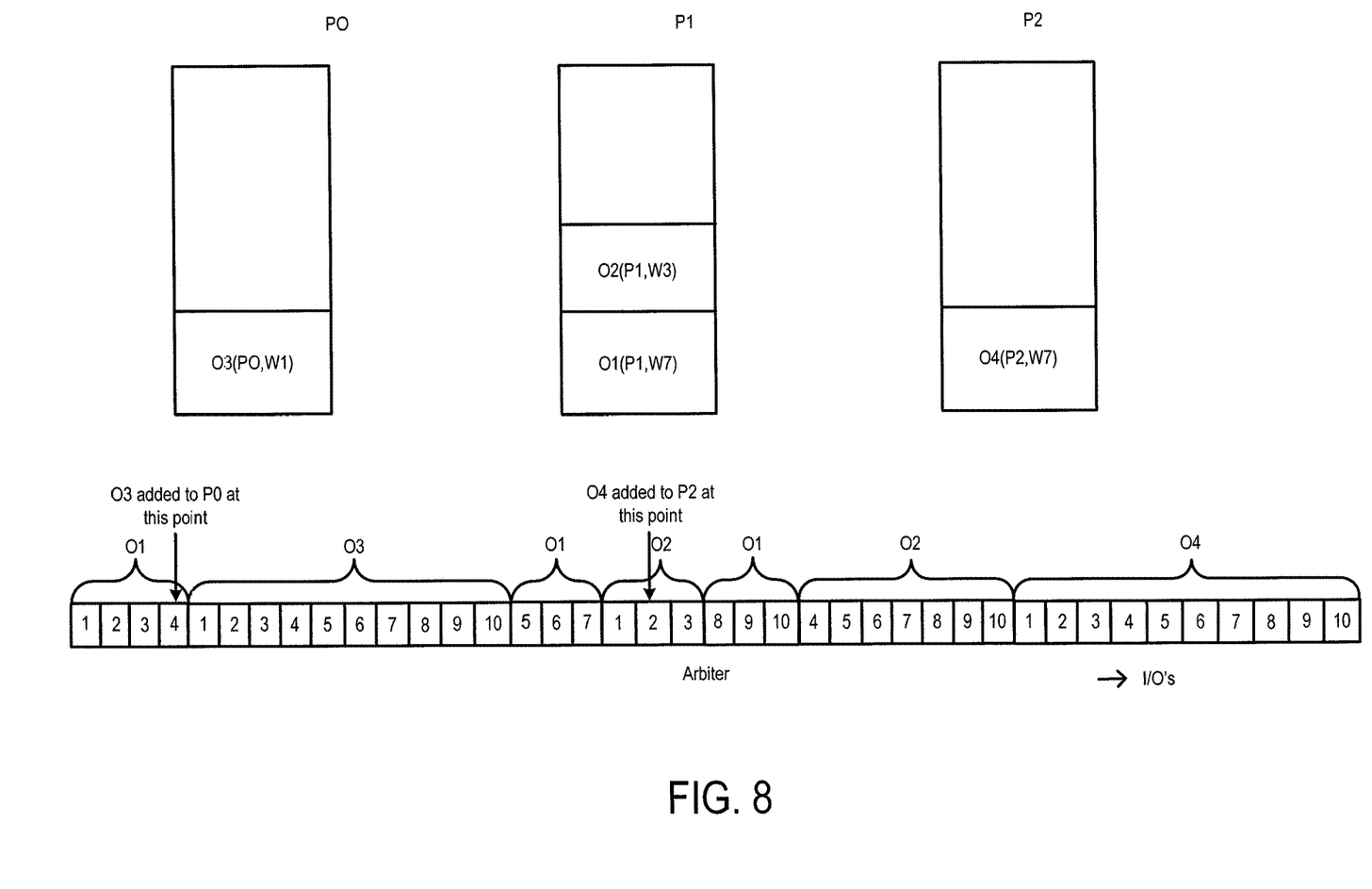
FIG. 8 is a block diagram of another use case of an embodiment.

FIG. 8 illustrates another example where there are requests in three different priority elements. This example explains the behavior of round robin when a critical operation is suddenly added to some higher priority element. As shown in FIG. 8, let's say O1 starts the execution. O1 will try to execute 7 I/O requests. But let's say an operation O3 of priority P0 is added when the $4^{th}$ I/O request of O1 is being executed. Since, the P0 operation has to be executed immediately, O1 finishes its $4^{th}$ I/O request and hands over control to O3. Now, O3 will start executing, and it gives control to other operations only when it is completely done. Once O3 is done, O1 and O2 will start executing as per their weightage. Once O1 and O2 are done, the lowest priority operation O4 will start executing.

The use of a weighted round-robin system inside a priority round-robin system to send memory operations to the storage system 200 can be used to address the inefficient bandwidth problem noted above. As discussed above, when the full bandwidth of the storage system is allocated to operations that do not need the entire bandwidth, the unused bandwidth is wasted (e.g., allocating the entire 10 MB/s of bandwidth for a 6 MB/sec video playback operation). Assigning different weights to operations in the same priority element can solve this problem. For example, the application can assign a weight to an operation that corresponds to a percentage of available bandwidth required for the operation. So, in the video playback example, the application can assign input-output requests for video playback the weight of 6 (for the 6 MB/s out of the available 10 MB/s) and assign another operation the weight of 4 (for the 4 unused MB/s out of the available 10 MB/s). This way, all ten IO slots can be used (FIG. 5B). This allows that bandwidth of the storage system to be efficiently utilized, with no wastage of bandwidth. Also, since the bandwidth of the storage system is allocated to operations based on demand, the user experience of the app will be greatly improved. Thus, these embodiments can provide a round robin system with interleaved weighted and priority arbiters to serve on-demand bandwidth of a storage system.

The application can assign priority and weight to an operation in any suitable way. In one embodiment, the application can allow a user (e.g., via a settings menu or other user interface) to decide the priority and weight of each operation as per their demand, per user experience to be achieved, per and/or specific use cases (e.g., video playback, thumbnail generation, backup, etc.). In another embodiment, the priority and/or weight assigned to a given operation can be configured automatically (e.g., through machine learning or artificial intelligence).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for sending memory commands to a storage system, the method comprising:
    performing the following in a processor in a host in communication with a storage system comprising a memory controller, wherein the processor in the host is not part of the storage system:
        assigning a priority and a weight to each of a plurality of memory commands; and
        sending the plurality of memory commands to the memory controller in the storage system in accordance with their assigned priority and assigned weight;
    wherein memory commands are sent to the memory controller in the storage system in a priority round-robin manner, in which:
    memory commands assigned to a relatively-higher priority level are sent to the memory controller in the storage system before memory commands assigned to a relatively-lower priority level; and
    memory commands assigned to a given priority level are sent to the memory controller in the storage system in a weighted round-robin manner in accordance with their assigned weight.

2. The method of claim 1, wherein a weight assigned to a memory command corresponds to a percentage of available bandwidth required for the memory command.

3. The method of claim 1, wherein at least one of the priority and the weight is user-configurable.

4. The method of claim 1, wherein at least one of the priority and the weight is automatically determined.

5. The method of claim 1, wherein the method is performed by an application downloaded from a server.

6. The method of claim 1, wherein the storage system is embedded in the host.

7. The method of claim 1, wherein the storage system is removably connectable to the host.

8. The method of claim 1, wherein the storage system comprises a three-dimensional memory.

9. A device comprising:
a processor; and
a computer-readable medium that stores computer-readable program code executable by the processor, wherein, when executed, the computer-readable program code causes the processor to:
generate priority arbiter comprising a plurality of priority levels, wherein operations assigned to a relatively-higher priority level are given priority over operations assigned to a relatively-lower priority level;
generate a plurality of weighted round-robin arbiters, wherein each weighted round-robin arbiter is associated with a respective one of the plurality of priority levels, and wherein each weighted round-robin arbiter is configured to send operations to its respective priority level in a weighted round-robin manner; and
send operations that are assigned respective priorities and respective weights to a memo controller in a storage system using the priority arbiter and the plurality of weighted round-robin arbiters, wherein the device is not part of the storage system.

10. The device of claim 9, wherein a weight assigned to an operation corresponds to a percentage of available bandwidth required for the operation.

11. The device of claim 9, wherein at least one of the priority and the weight is user-configurable.

12. The device of claim 9, wherein at least one of the priority and the weight is automatically determined.

13. The device of claim 9, wherein the computer-readable program code comprises an application downloaded from a server.

14. The device of claim 9, wherein:
the device is configured to be in communication with a plurality of storage systems; and
when executed, the computer-readable program code causes the processor to generate a separate set of priority and weighted round-robin arbiters for each storage system.

15. The device of claim 9, wherein the storage system is embedded in the device.

16. The device of claim 9, wherein the storage system is removably connectable to the device.

17. The device of claim 9, wherein the storage system comprises a three-dimensional memory.

18. A device comprising:
means for assigning a priority and a weight to each of a plurality of input-output requests; and
means for sending the plurality of input-output requests to a memory controller in a storage system in accordance with their assigned priority and assigned weight;
wherein input-output requests are sent to the memo controller in the storage system in a priority round-robin manner, in which:
input-output requests assigned to a relatively-higher priority level are sent to the memory controller in the storage system before input-output requests assigned to a relatively-lower priority level; and
input-output requests assigned to a given priority level are sent to the memory controller in the storage system in a weighted round-robin manner in accordance with their assigned weight; and
wherein the device is not part of the storage system.

19. The device of claim 18, wherein a weight assigned to an input-output request corresponds to a percentage of available bandwidth required for the input-output request.

20. The device of claim 18, wherein at least one of the priority and the weight is user-configurable.

* * * * *